July 23, 1968            E. PLUMAT            3,393,987
METHOD OF AND APPARATUS FOR PROTECTING SHEET GLASS
DURING THE THERMAL TREATMENT THEREOF
Filed May 16, 1966
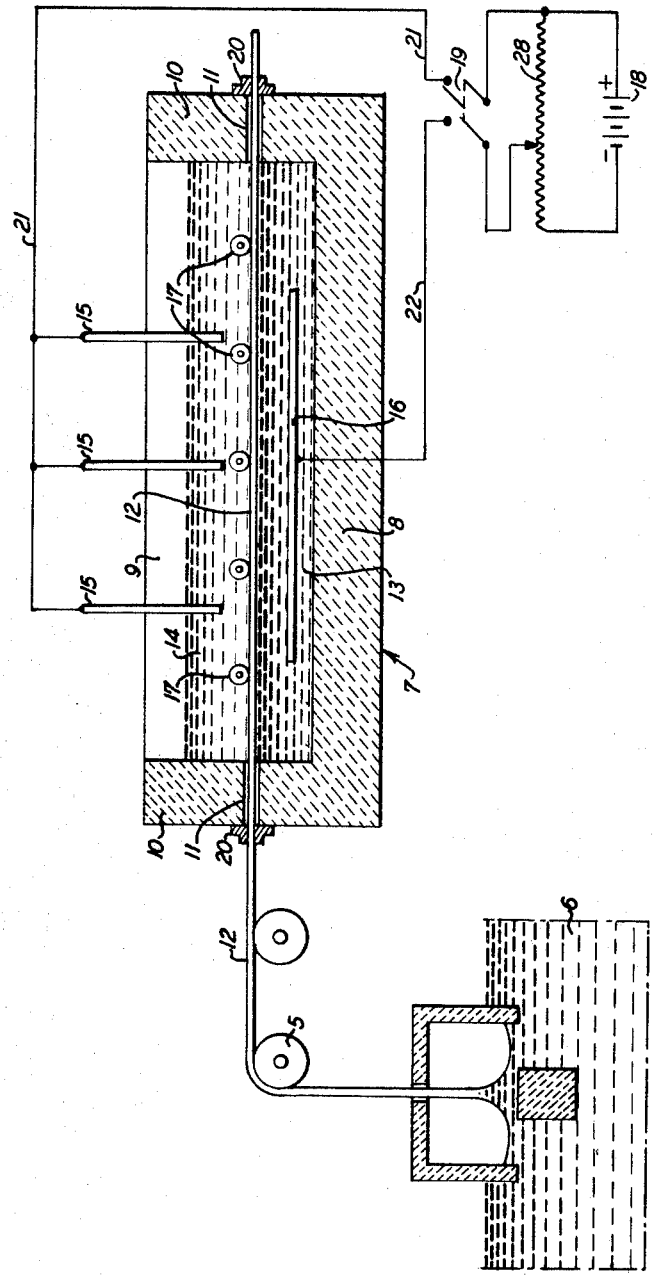
INVENTOR
EMILE PLUMAT
BY
*John F. Hart*
ATTORNEY United States Patent Office 3,393,987
Patented July 23, 1968

3,393,987
METHOD OF AND APPARATUS FOR PROTECTING SHEET GLASS DURING THE THERMAL TREATMENT THEREOF
Emile Plumat, Gilly, Belgium, assignor to Glaverbel, Brussels, Belgium, a Belgian company
Continuation-in-part of application Ser. No. 286,302, June 7, 1963. This application May 16, 1966, Ser. No. 550,559
Claims priority, application Belgium, July 27, 1962, 495,905, Patent 620,787
10 Claims. (Cl. 65—29)

This application is a continuation-in-part of my original application Ser. No. 286,302, filed June 7, 1963, now abandoned.

This invention relates to the manufacture of sheet glass and is particularly concerned with the protection thereof while in the form of a continuous ribbon, or as separate sheets, during the finishing thermal treatment of the surfaces of such sheet glass.

It is known to thermally treat sheet glass by floating it on a metal bath. In accordance with certain of these processes, the glass ribbon formed by rolling the glass between two rollers is slid onto a metal bath which brings the glass to a temperature that insures a fire polish of the two faces of the glass ribbon or strip. In others of such processes, cut glass sheets are deposited on a metal bath which has been raised to a fairly high temperature. Because of their displacement on such a bath, the glass sheets are heated to a temperature close to the softening temperature. The heated sheet glass is then placed in a rapid cooling chamber in which a metal bath at low temperature and jets of cold air ensure hardening of the sheet glass. These prior processes however, have very substantial disadvantages which render their practice undesirable. One disadvantage is that the usual fusible metals which are employed in such baths, such as tin, rapidly oxidize in an atmosphere which is but slightly oxidizing, at the working temperatures. Consequently, unless special precautions are taken, the oxide particles which are formed at the bath surface may damage the surfaces of the sheet glass. Another disadvantage of such prior processes, is the tendency of the alkali ions contained in the glass, generally $Na^+$, to diffuse into the molten metal. It had been previously thought that these diffused alkali ions were replaced by metal ions, for instance $Sn^{++++}$, but it is now believed that the small quantity of metal which sometimes adheres to the surface of the glass after it is cooled result from a physical and not from an ionic adhesion.

In order to overcome the disadvantage first above discussed, the art practiced the heat treating operation in either an absolutely neutral, or a reducing atmosphere, but such practice was found to be very expensive. The art then proposed to protect the metal against the oxidizing atmosphere by means of a cover constituted of a molten salt. The sheet glass was then slid between the two baths of molten materials so that it could be heat treated without disturbing the protection afforded by the molten salt bath to the lower metal bath from the oxidizing amosphere. This method however, gave rise to another drawback, namely, the tendency of the ions of the molten salt, such as $Li^+$, $K^+$, $Rb^+$ and $Mg^{++}$, to diffuse into the glass, and the tendency of the alkali ions of the glass to diffuse into the salt bath. As a result of this phenomenon and the exchange of ions between the glass and the metal bath the surfaces of the sheet glass and sometimes the mass of the glass are considerably modified to the detriment of the glass sheet. For example, it has been found that when a sodium sheet glass is brought into contact with LiCl for ten minutes at a temperature of 850° C., the lithium ions will penetrate to a depth of 1 mm. into the glass, replacing the sodium ions of the glass. The lithium ion is smaller (1.2 Angstrom) than the sodium ion (1.9 Angstrom), but at that temperature stresses are avoided because of the internal rearrangement of the molecules. However, during cooling when the strain point of the glass is approached, the outer layer which is rich in lithium, will be subjected to longitudinal compression because the coefficient of expansion of lithium glass is lower than that of the sodium glass. As a consequence of the tension gradient between the lithium glass and the sodium glass, the surface of the sheet glass chips or shells very easily. On the other hand, if the same glass is subject to the action of LiCl at a temperature below the strain point of the glass, for example, 400° C., no structural rearrangement of the glass can take place, thereby subjecting the outer layer of the glass to such longitudinal compression because of the smaller lithium ions which have replaced the sodium ions in such outer layer, that such outer layer will be microscopically cracked to such an extent that it will assume a milky white appearance. Such a glass will break at the slightest compressive stress or shock. If the same sodium glass is subjected to a salt of a more voluminous cation, such as KCl, at approximately the two above mentioned temperatures above and below the strain point of the glass, there will result in the case of the high temperature treatment a glass having an outer layer which is stretched so that it is under tension and consequently rendering the glass sheet brittle, and in the case of the low temperature treatment a glass having an outer layer under longitudinal compression of such extent that the glass sheet may break spontaneously.

It would seem that a likely solution to the problem would lay in protecting the sodium glass by means of a molten sodium salt because in such case the sodium ion migrations from the glass into the salt bath and vise versa would compensate themselves, and the practical result would be that the glass would be damaged to a very little extent. However, it has been found that other considerations often require the use of cations which are different from that of the glass, or of mixtures of salts of several cations, such as, for example, the fusibility of the salt over the whole range of temperatures of the treatment of the glass, for instance, 1100° C. to 500° C., the vapor pressure of the salt, the corrosion of the refractory materials of the furnace by certain types of anions, etc.

It is the principal purpose of the instant invention to retain the advantages of heat treating sheet glass between a metallic bath and a salt bath, without incurring any of the aforesaid disdvantages of such treatment as heretofore practiced.

A further object of the invention is to provide a practical method of protecting sheet glass being treated as aforesaid no matter what the constituents of the glass may be, or the conditions under which such treatment is being practiced.

I have found that the aforesaid purposes may be accomplished by applying across the interfaces of the metallic bath, the sheet glass and the salt bath, an electrical potential which is dependent on the potential difference existing between such items as a result of the ion diffusion barriers at the interfaces thereof, and which is such that it reduces to the desired extent the emigration of ions at such interfaces. I have also found that while the diffusion barrier between the glass and the metal bath is practically nil, in spite of the existence of a diffusion of alkali ions into the metal, there exists a substantial diffusion barrier between the sheet glass and the salt bath. In view of this asymmetric character of the phenomena it is not believed possible to devise any standards which may be applied with any confidence. As in the case of every energy barrier however, this diffusion barrier can be explained in terms of an activation energy or by a potential difference. In the case of a molten salt containing but a single ion, there need only be taken into account the barrier between this ion and the glass. In the case of salts containing several ions, however, the diffusion barrier that should be taken into consideration is the one between the most electropositive ion and the glass. Thus, the salts of the following should be considered in the decreasing order in which they are arranged —$Li^+$, $Na^+$, $K^+$, $Rb^+$, $Cs^+$, . . . $Mg^{++}$ and . . . $Mn^{++}$.

The accompanying drawing illustrates by way of example a longitudinal sectional view of a sheet glass furnace constructed for the practice of the invention.

In the drawing the reference numeral 7 indicates generally a tank composed of refractory material of the type usually employed in the construction of glass furnaces and having a base 8, side walls 9 and end walls 10. Each of the end walls 10 is provided with a slot 11 equipped with a fluid-tight joint 20 through which the glass sheet 12 enters and leaves the tank. The tank 7 is associated with a glass furnace of known construction and the glass sheet may initially be drawn from the molten glass bath 6 thereof vertically and then may be deflected horizontally by a roll 5 in a known manner into the tank 7, as illustrated. Thus, the glass sheet is caused to enter the tank 7 directly from the furnace and before it has completely solidified.

The tank 7 contains a lower bath 13 of molten metal such as tin, lead, zinc and copper, such molten bath having a density higher than the glass sheet 12 floating thereon. The glass sheet 12 is sandwiched between the metal bath 13 and an upper salt bath 14 which may be of less density than the glass, or which may be of greater density than the glass because of the latter's viscosity. For example, the salt bath may have a density of 4 at 850° C. and the glass at that temperature a density of 2.5 without the molten salt falling beneath the glass due to the latter's viscosity. Preferably the glass sheet is maintained in uniform contact with the metal bath 13 by a series of rollers 17 engaging the upper face of such sheet. It will thus be seen that shortly after the glass sheet issues from the drawing chamber it is inserted through one of the slots 11 which are at the level of the interfaces of the two baths 13 and 14, and between such baths and advances across such superimposed baths to the other slot 11 through which the glass sheet discharges.

Extending into the salt bath 14 are three vertically disposed rods 15 which are connected by and electrical conductor 21 to an electrical inverter 19. Immersed in the metal bath 13 is a plate 16 of any suitable configuration dependent on the results to be attained and which is connected by an electrical conductor 22 to the inverter 19. The rods 15 and plate 16 are electrodes which are connected through the inverter 19 and regulator apparatus, such as the potentiometer 28, to a voltage source 18 which in the embodiment illustrated is such that the electrodes 15 are positive with respect to the electrode 16. By adjustment of the potentiometer 28 there is applied across the electrodes 15 and 16 a D.C. potential difference. In accordance with the invention there is applied across the two baths a continuous D.C. potential difference which is exactly opposed to that found existing by measurement as a result of the ion diffusion barrier or barriers present between such electrodes, in order to nullify the tendency of the ions to migrate from one material to the other. The D.C. potential difference existing between the metal bath 13 and the salt bath 14 may be measured by means of an electrometer which measures voltage without consumption of current, and employing the electrodes 15 and 16 in making such measurement. After this measurement has been taken, there is applied to the same electrodes a D.C. potential difference which is opposed to that determined by such measurement and which is between 0 and the value obtained by such measurement.

Assuming for example, that it is desired to protect a sodium sheet glass inserted between a molten tin bath and a salt bath composed of a mixture of LiCl, KCl and $BaCl_2$, it will only be found necessary from what has previously been stated, to take into account the barrier of $Li^+$ with respect to the sodium glass, whatever the sodium content may be. Thus, since the barrier between the glass and the tin is zero and it is only necessary to take into account the most electropositive ion, namely, $Li^+$, the barrier between the glass and the salt bath is —0.88 volt at 600° C. Accordingly, the potentiometer 28 will be adjusted so that the salt bath will be brought to a potential of —0.88 volt with respect to the tin which is maintained at the potential 0, in order to avoid any damage to the surface of the glass. Under these conditions it will be found (1) that the lithium ion will not diffuse into the glass, (2) that the $K^+$ and $Ba^{++}$ ions will not diffuse into the glass, (3) that the $Na^+$ ions of the glass will not diffuse into the molten salt, and (4) that the $Na^+$ of the glass will not diffuse into the molten tin. These phenomena are surprising since they cannot be explained by considerations which are only of an electrical nature. It would seem that these results are attained rather by a combination of electrical and geometrical phenomena. Thus, it may be that the lithium ion is electrically prevented from penetrating into the glass, and that so long as the sodium ion of the glass is not expelled by the entrance therein of the lithium ions, the sodium ions are retained in the glass. However, this would not seem to explain the reason for the prevention of the diffusion of the sodium ion into the tin. Further, if the sodium glass were treated in a salt bath composed of $KNO_3$, AgCl and KCl at 650° C. one should still only take into account the potassium-sodium glass barrier which is of the order of +0.35 volt, for it has been found that an opposing potential difference of that order will not only prevent the diffusion of the $K^+$ ion into the glass, but will also prevent the diffusion of the $Ag^+$ ion. This is surprising because the silver-sodium glass barrier is +0.60 volt, and it would therefore seem unlikely that the $Ag^+$ ion of the salt would be prevented from entering into the glass by a potential difference of only +0.35 volt applied to the salt.

Examples of metallic baths that may be used in the practice of the invention are as follows:

| | Fusion temperature, ° C. | Boiling temperature, ° C. |
|---|---|---|
| Sn | 231 | 2,270 |
| Pb | 328 | 1,615 |
| Cu | 1,083 | 1,981 |
| 80% Sn, 10% Cu, 5% Al, 5% Ag | 212 | 2,140 |

Zinc and other combinations of tin, lead, zinc, copper, aluminum and silver may advantageously be used as the metallic bath.

The salt bath may be composed of a molten salt containing one or more of the alkali or alkaline earth metals, and comprising cobalt, manganese and the following examples of usable salt baths:

|  | Fusion temperature, °C. | Boiling temperature, °C. | Density |
|---|---|---|---|
| $BaCl_2$ | 925 | 1,560 | 3.9 |
| $CaCl_2$ | 772 | 1,600 | 2.5 |
| $Cu_2Cl_2$ | 422 | 1,366 | 3.53 |
| LiBr | 545 | 1,265 | 3.51 |
| LiCl | 613 | 1,353 | 2.5 |
| $MgCl_2$ | 708 | 1,412 | 2.5 |
| KCl | 776 | 1,500 | 2.5 |
| $KNO_3$ | 334 |  | 2.5 |
| 80% AgCl+NaCl | 420 | 1,500 | 2.42 |
| NaCl | 801 | 1,413 | 2.5 |
| 10% $BaCl_2$<br>2% AgCl<br>1% LiBr<br>5% NaCl<br>82% $CaCl_2$ | 749 | 1,528 | 2.9 |
| $Cr_2Cl_2$ | 422 |  | 2.7 |
| $LiNO_3$ | 264 | 600 | 2.38 |

Following are examples of the approximate D.C. potential differences that may be applied between the molten salt and the molten metal in the treatment of sodium glass at the indicated temperatures:

|  | $Li^+$, v. | $K^+$ | $Ag^+$ | $Cu^+$ | $Na^+$ | $Li^+/K^+/Na^+$ |
|---|---|---|---|---|---|---|
| Temp., °C.: |  |  |  |  |  |  |
| 400 | 0.75 | +0.16 | +0.44 | +0.55 | 0 | −0.75 |
| 500 | 0.81 | +0.24 | +0.50 | +0.62 | 0 | −0.81 |
| 600 | 0.88 | +0.31 | +0.57 | +0.69 | 0 | −0.88 |
| 700 | 0.96 | +0.39 | +0.64 | +0.74 | 0 | −0.96 |
| 1,000 | 1.27 | +0.65 | +0.90 | +0.99 | 0 | −1.27 |

The above table of potential differences is suitable for any glass containing sodium even though such glass might also additionally contain potassium or rubidium, and the potential differences given therein should be applied preferably substantially as indicated. Thus, should a sodium glass be treated between a molten lithium salt and any of the above indicated molten metals at 600° C., it has been found that the ideal potential difference to be applied across the baths is −0.88 volt. However, it has also been found that potential differences of between −.88 volt and 0 will diminish the diffusions and thus protect partially the surface of the glass, and that a potential difference of up to −1.08 volts can be used without trouble. But if the potential difference is increased above −1.08 volts, it has been found that the $Na^+$ −ion starts to be extracted from the glass. Accordingly, while in the indicated example, −.88 volt in the ideal potential difference to be employed, potential differences of approximately −0.20 volt above such ideal may be utilized to accomplish the purposes of the invention. It will be remembered also that when a mixture of salts is used in the salt bath, the potential difference to be selected from the table thereof is the one indicated for the element which is the most electropositive. Also should temperatures intermediate that indicated in the table be used, the potential difference selected should be proportional to the temperature difference. Thus, in the case of the treatment of a sodium glass, such as the following illustrative sodium glass designated No. 1, using a salt bath containing lithium and a temperature of either 1000° C., 800° C. or 650° C., the ideal potential differences used should be either −1.27 volts, −1.0 volt, or −0.92 volt, respectively.

Typical examples of sodium sheet glasses that have been treated in accordance with the invention contained the following elements:

|  | Glass No. 1, percent | Glass No. 2, percent |
|---|---|---|
| $SiO_2$ | 70 | 86 |
| $Na_2O$ | 15 | 7 |
| CaO | 7 | 2 |
| MgO | 5 | 2 |
| $Fe_2O_3$ | (¹) | (¹) |
| $Al_2O_3$ | 3 | 3 |

¹ Traces.

While I have heretofore more particularly referred to the treatment of sodium glasses, it will be understood that any glasses whatsoever containing an alkali ion may be treated according to the invention provided the potential difference is modified in accordance with the alkali ion contained therein. Thus, assuming that the glass to be treated contains no sodium, and the salt bath contains no lithium, but contains potassium as its most electropositive element, all of the values in the above potential difference table diminished by 0.16 volt, the difference between the $K^+$ and $Na^+$ ions, may be used in the treatment of such glass at the temperatures and with salt baths containing the elements other than lithium indicated in such table.

In the practice of the process the glass may be treated at any desired temperature and this temperature may vary along the path of the glass sheet through the bath provided the potential differences are varied to take care of such temperature variations. For example, if the difference of temperature is such between two points in the path of travel of the glass, that it corresponds to a variation of approximately 0.2 volt with respect to the value given in the aforesaid potential difference table, it will be advisable to modify the D.C. potential difference accordingly to prevent the extraction of alkali ions from the glass. Thus, one may arrange a single electrode of suitable length in the metallic bath as indicated in the drawing and arrange several electrodes at different D.C. potential differences in the salt baths. Also, temperatures may be employed for glasses in which the conditions thereof range from that of a very fluid one, for instance, the above indicated glass No. 1 at 1,300° C. (viscosity=$10^{2.4}$ poises), to a solidified glass, for instance by applying a temperature up to 500° C. (viscosity=$10^{13}$ poises), passing through the softening point ($T=762°$ C.) and the strain point ($T=513°$ C.).

The protection afforded to the glass by the treatment is immediately effective at all of the temperatures and is maintained for long durations of time. Thus it has been found that portions of sheet glass having the compositions of the aforesaid glasses Nos. 1 and 2, which were left between the molten metal and the molten salt (25% KCl, 50% $BaCl_2$ and 25% $MgCl_2$) within a temperature gradient of from 1000° C. to 650° C., and with the application of adequate D.C. potential differences for a period of more than 24 hours, were perfectly protected.

While I have hereinabove described and illustrated in the drawings examples of the manner in which the invention may be practiced, it will be apparent to those skilled in the art that various changes may be made therein without departing from the spirit of the invention or the scope of the appended claims.

I claim:

1. The method of protecting sheet glass subjected to thermal treatment between a molten metal bath which is denser than the glass and a molten salt bath of a density not greater than 4, characterized in that there is measured with the sheet glass therebetween, the potential difference existing between a place in the molten metal and a place in the molten salt, and then applying direct current electric power between such places in the molten metal and the molten salt to create between such places and across the sheet glass a direct current potential difference opposed to and not substantially greater than the potential difference found to be existing therebetween and sufficient to substantially prevent the emigration of ions between the molten salt and the glass, and between the glass and the molten metal.

2. The method of claim 1, in which said existing potential difference between such places in the molten metal and the molten salt is measured at a plurality of spaced portions of the sheet glass and if such measured potential difference is variable at such portions, applying opposing variable direct current potential differences at such portions to prevent the ion emigration thereat.

3. The method of protecting sheet glass subjected to thermal treatment between a molten metal bath which is denser than the glass and a molten salt bath of a density not greater than 4, characterized in that there is applied to the molten salt and between a place in the molten salt and a place in the molten metal, and across the glass sheet therebetween direct current electric power capable of creating between such places a potential difference approximating that electric potential given in the following table as a function of the temperature of a sodium glass for the most electropositive element in the molten salt with which the glass is being treated at that temperature, such given potential being diminished by 0.16 if the glass is without sodium and treated in a salt bath which is without lithium and contains potassium as the most electropositive element:

| Temp., °C.: | $Li^+$, v. | $K^+$ | $Ag^+$ | $Cu^+$ | $Na^+$ | $Li^+/K^+/Na^+$ |
|---|---|---|---|---|---|---|
| 400 | −0.75 | +0.16 | +0.44 | +0.55 | 0 | −0.75 |
| 500 | −0.81 | +0.24 | +0.50 | +0.62 | 0 | −0.81 |
| 600 | −0.88 | +0.31 | +0.57 | +0.69 | 0 | −0.88 |
| 700 | −0.96 | +0.39 | +0.64 | +0.74 | 0 | −0.96 |
| 1,000 | −1.27 | +0.65 | +0.90 | +0.99 | 0 | −1.27 |

4. The method of protecting sheet glass thermally treated by floating it between the surfaces of a molten metal bath and a molten salt bath, which comprises inserting the formed glass sheet between two superimposed baths of immiscible materials, the lower bath being constituted of a molten material having a higher density than glass and composed of at least one metal selected from the group comprising tin, lead, zinc, copper, aluminum and silver, and the upper bath being constituted of a molten material having a density not greater than 4, and composed of a molten salt of one or more metals selected from the group comprising alkali or alkaline earth metals, cobalt, manganese, barium, calcium, copper, lithium, magnesium, potassium, silver, sodium and chromium, and the halides thereof, and then applying between spaced places in the baths of molten metal and molten salt and across the glass sheet therebetween direct current electric power capable of creating between such places a potential difference that will modify the potential difference existing between such places in said baths as a result of the barrier ion diffusion therebetween.

5. The method defined in claim 4, in which the applied direct current electric power is so selected that it creates a potential difference that is substantially opposed to a potential difference constituted of the potential differences between such places created by the ion diffusion barriers between said lower and upper baths and the glass sheet.

6. The method defined in claim 4, in which the applied direct current electric power is variable to create a variable potential difference that is variably applied to different portions of the glass sheet.

7. The combination in apparatus for protecting sheet glass being subjected to a thermal treatment between the surfaces of a molten metal bath and a molten salt bath, of a tank of heat refractory material provided on at least one side with a horizontal slot through which the glass sheet is inserted into the tank, said tank being provided with a pair of electrodes, one of such electrodes being located at a level higher than that of the horizontal slot and the other electrode being located at a level below that of said slot, the tank containing up to the level of the slot a lower bath of molten material which is denser than the glass and constituted of at least one metal selected from the group comprising tin, lead, zinc, copper, aluminum and silver, and above the level of said slot an upper bath of molten material having a density not greater than 4, and constituted of a molten salt of one or more metals selected from the group comprising alkali or alkaline earth metals, cobalt, manganese, barium, calcium, copper, lithium, magnesium, potassium, silver, sodium and chromium, and the halides thereof, so that said one electrode is situated in said upper bath and said other electrode is situated in said lower bath, and the glass sheet is inserted between the surfaces of such two baths and is exposed to an electrical potential difference applied by the electrodes in such baths, and means for causing said electrodes to apply an electrical direct current potential difference that will modify the potential difference existing between said upper and lower baths as a result of the barrier ion diffusion therebetween.

8. The combination defined in claim 7, in which said electrodes are constructed and arranged to apply a potential difference across substantially the entire area of the glass in said tank.

9. The combination defined in claim 7, in which said electrodes are constructed and arranged to apply a potential difference across a part only of the area of the glass sheet in said tank.

10. The combination defined in claim 7, in which said electrodes are constructed and arranged to apply the potential difference with varied intensity to different portions of the glass sheet in said tank.

References Cited

UNITED STATES PATENTS

| 1,592,429 | 7/1926 | Kraus | 65—30 X |
| 2,198,733 | 4/1940 | Leibig et al. | 65—30 X |
| 2,754,559 | 7/1956 | Fromson. | |
| 3,218,220 | 11/1965 | Weber | 65—30 |
| 3,242,060 | 3/1966 | Le Cleric. | |

DONALL H. SYLVESTER, *Primary Examiner.*

F. W. MIGA, *Assistant Examiner.*